United States Patent [19]

Berdan

[11] Patent Number: 4,822,205
[45] Date of Patent: Apr. 18, 1989

[54] FOLD-UP CORNER PIECE FOR SPACER TUBE ASSEMBLY

[75] Inventor: Gunter Berdan, Weston, Canada

[73] Assignee: Indal Limited, Ontario, Canada

[21] Appl. No.: 42,035

[22] Filed: Apr. 24, 1987

[30] Foreign Application Priority Data

Jan. 21, 1987 [CA] Canada .................................. 527784

[51] Int. Cl.⁴ .............................................. B25G 3/36
[52] U.S. Cl. .................................. 403/402; 403/403; 403/382; 403/295
[58] Field of Search ............... 403/382, 401, 402, 403, 403/205, 295

[56] References Cited

U.S. PATENT DOCUMENTS

| | | | |
|---|---|---|---|
| 242,513 | 6/1881 | Crane | 403/382 |
| 646,347 | 3/1900 | Betty | 182/24 |
| 782,639 | 2/1905 | Bailey | 403/382 |
| 2,861,659 | 11/1958 | Hagerty et al. | 403/231 |
| 2,989,788 | 6/1961 | Kessler | 403/295 |
| 4,011,706 | 3/1977 | Dupree | 403/231 |
| 4,067,161 | 1/1978 | Rensch | 52/285 |
| 4,105,348 | 8/1978 | Anderson | 403/172 |
| 4,357,744 | 11/1982 | McKenzie et al. | 29/451 |
| 4,513,546 | 4/1985 | Gow | 52/172 |
| 4,530,195 | 7/1985 | Leopold | 52/726 |
| 4,546,723 | 10/1985 | Leopold et al. | 118/669 |
| 4,628,582 | 12/1986 | Leopold | 29/451 |

FOREIGN PATENT DOCUMENTS

| | | |
|---|---|---|
| 861867 | 3/1978 | Belgium . |
| 1042975 | 11/1978 | Canada . |
| 1169299 | 6/1984 | Canada . |
| 2426722 | 12/1975 | Fed. Rep. of Germany . |
| 2625993 | 12/1977 | Fed. Rep. of Germany . |
| 429360 | 9/1911 | France . |
| 2310489 | 5/1976 | France . |
| 2563270 | 4/1985 | France . |
| 1381507 | 1/1975 | United Kingdom . |
| 1507497 | 4/1978 | United Kingdom . |
| 1522724 | 8/1978 | United Kingdom . |
| 830297 | 3/1982 | World Int. Prop. O. . |

OTHER PUBLICATIONS

Non-Patent Publication—"Swivel Key" Brochure of Hygrade Metal Moulding.

Primary Examiner—Andrew V. Kundrat
Attorney, Agent, or Firm—Nixon & Vanderhye

[57] ABSTRACT

A corner piece for use in a spacer tube assembly includes a pair of arms each adapted to enter into and engage within an end portion of a respective spacer tube; hinge means defining a hinge axis and permitting said arms to be pivoted into a generally right angle relationship with each other; and friction means on each of said arms adapted to come into close contacting relation with each other as said arms are pivoted toward said right angle relationship to frictionally retain said arms in said generally right angle relationship.

10 Claims, 2 Drawing Sheets

FOLD-UP CORNER PIECE FOR SPACER TUBE ASSEMBLY

BACKGROUND OF THE INVENTION

This invention relates generally to the field of multiple pane insulating windows or glazing panels and, in particular relates to an improved corner connector piece for joining adjacent spacer tubes which are used to separate the panes of a multiple pane glazing panel.

It is very well known in the art to provide windows having multiple panes of glass, the panes being separated by an insulating air space. It is common practice to separate the panes of glass by means of a perimeter frame comprising sections of spacer tubing joined together at adjacent ends and disposed between the panes in sealed relation thereto. The tubes commonly contain a desiccant which serves to absorb moisture from the air which is trapped within the space between the window panes.

The prior art has provided various forms of corner pieces for use in connecting together the tubes of the spacer assembly. One such arrangement is illustrated in our U.S. Pat. No. 4,296,587 issued Oct. 27th, 1981. This patent illustrates a rigid corner piece having a pair of arms arranged at right angles to one another with each arm being adapted to enter into and engage within an end portion of a respective spacer tube. In order to provide firm engagement between the corner piece and the spacer tubes, the corner piece is provided with teeth which engage with serrations formed on interior walls of the respective spacer tubes. The corner piece is designed to substantially fully block the end of the spacer tube when inserted thereby to prevent falling out of the desiccant material during assembly.

Although the above-noted rigid corner piece arrangement has been found to perform very well, it has been found desirable, in many instances, to move away from the rigid corner piece arrangement previously used and to provide a corner piece which can be flexed or pivoted such that the arms of the corner piece can move from a generally straight line relationship relative to one another into a generally right angle relationship with one another. A corner connector of this type enables the individual spacer tubes to be arranged in a linear relationship during the initial spacer frame assembly process. The corner connectors, in an open position, are inserted into each adjacent end of the aligned spacer tubes. Following this procedure, the complete frame comprising four spacer tubes and four corner pieces is then squared up into the desired rectangular shape with the corner pieces being arranged to hold the desired rectangular shape plus allowing the spacer frame to be positioned between an adjacent pair of glazing panels for the purpose described previously.

The prior art has provided several forms of flexible corner pieces for use in the above-described manner. These corner pieces generally comprise a pair of arms which are arranged to enter into and engage within an end portion of a respective spacer tube. These arms are joined together by a flexible portion which enables the arms to be pivoted into a generally right angle relationship with each other. In order to secure the arms in the right angle relationship, the prior art structures employ interengaging portions which may be snap-fitted together to hold the arms of the corner piece in the desired right angle relationship. An example of such snap-fitting portions comprises an arrow-shaped male member which fits into a correspondingly shaped female opening. Various other interlocking shapes and configurations have also been provided. Although these arrangements are, generally speaking, operable, they have disadvantages in that the interlocking shapes are relatively complex thus requiring the use of relatively complex molding equipment and processes. Many of these designs also have recesses or openings therein which allow some of the mastic sealing compound which is employed to effect a seal between the spacer and the glazing panels to escape thus increasing the possibility of air/moisture leakage into the space between the glazing panels.

SUMMARY OF THE INVENTION

It is a general object of the invention to provide a fold-up corner piece of the character described, which corner piece includes improved means for retaining the arms of the corner piece in the desired angular relationship to one another.

In particular, the present invention provides a corner piece for use in a spacer tube assembly comprising: a pair of arms each adapted to enter into and engage within an end portion of a respective spacer tube; hinge means defining a hinge axis and permitting said arms to be pivoted into a predetermined angular relationship with each other (most commonly a right angle); and friction means on each of said arms adapted to come into close contacting relation with each other as said arms are pivoted toward said predetermined angular relationship to frictionally retain said arms in said angular relationship.

The above-noted friction means desirably comprises fin means on each of the arms which extend generally normal to the hinge axis. The fin means on one of the arms is arranged to come into tight interdigitating or interleaved relationship with the fin means on the other arm as the arms are pivoted toward the predetermined angular relationship. Preferably, the fin means comprise multiple spaced apart generally parallel fins on each of the arms, such fins having, substantially planar walls which are substantially devoid of interengaging catches or recesses or the like so that substantially pure frictional engagement takes place between the tightly interleaved fins Preferably, these fins are disposed closely adjacent the hinge means. The multiple fin walls of the fins are preferably slightly angled relative to one another to provide a small amount of draft so that as the arms are moved toward the predetermined angular relationship, the tightness of the interdigitating or interleaved relation between the fins increases.

The corner piece is preferably of a one-piece molded plastics construction with the hinge comprising a thin flexible portion located between the arms.

Stop means in the form of shoulders are preferably provided on the arms to define the predetermined angular relationship between them. The arms are also preferably provided with flexible teeth for engaging the interior portions of a spacer tube.

Further aspects of the invention will become apparent from an examination of the following description and the accompanying claims.

BRIEF DESCRIPTION OF THE DRAWINGS

In drawings which illustrate an embodiment of the invention.

DESCRIPTION OF THE PREFERRED EMBODIMENT

Figure 2:
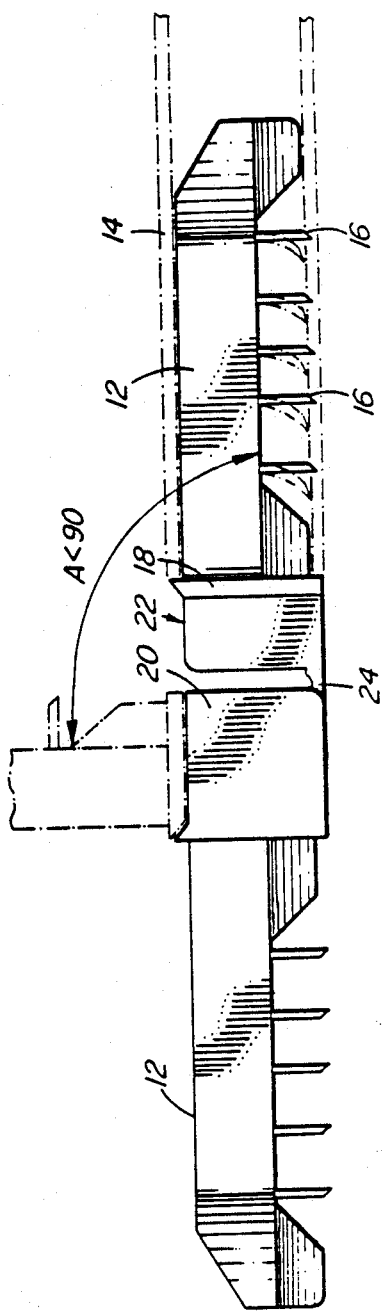
FIG. 2 is a side elevation view thereof.

The corner piece 10 is illustrated as being of a one-piece molded plastics construction. A preferred material is nylon in a suitable molding grade. The corner piece 10 includes a pair of opposed arms 12 each being adapted to enter into and engage within an end portion of a respective spacer tube in known manner. A portion of a spacer tube 14 is illustrated in phantom in FIG. 2. It will be noted that each arm includes a plurality of spaced apart teeth 16 which flex in the manner indicated when the arm is inserted into the spacer tube end portion, with such teeth 16 gripping the tube interior to strongly resist withdrawal of the arm. The spacer tube interior wall may desirably include serrations (not shown) which engage with the teeth thereby to strongly resist withdrawal of the arm. The configuration of each arm 12 is not critical, it being noted that the cross-sectional area of the arm should be sufficiently great as to substantially fill the end portion of the spacer tube thereby to prevent the falling out of the previously noted desiccant material. Both arms include a shallow ridge portion 18 against which the end of the spacer tube abuts when the associated arm 12 has been fully inserted.

The central portion of the corner piece includes the previously noted friction means which come into close contacting relation with each other as the arms 12 are pivoted toward a right angle relationship with each other thereby to frictionally retain the arms in that position. Accordingly, at the inner ends of the arms 12 there are located respective first and second sets of fins 20 and 22. A hinge portion 24 comprising a thin flexible portion of the plastics material located between the arms 12 defines a pivot axis X—X thereby permitting one arm 12 to be pivoted relative to the other as shown by arrows A from the full line position illustrated in FIG. 2 to the dashed line position also illustrated in FIG. 2.

Figure 1:
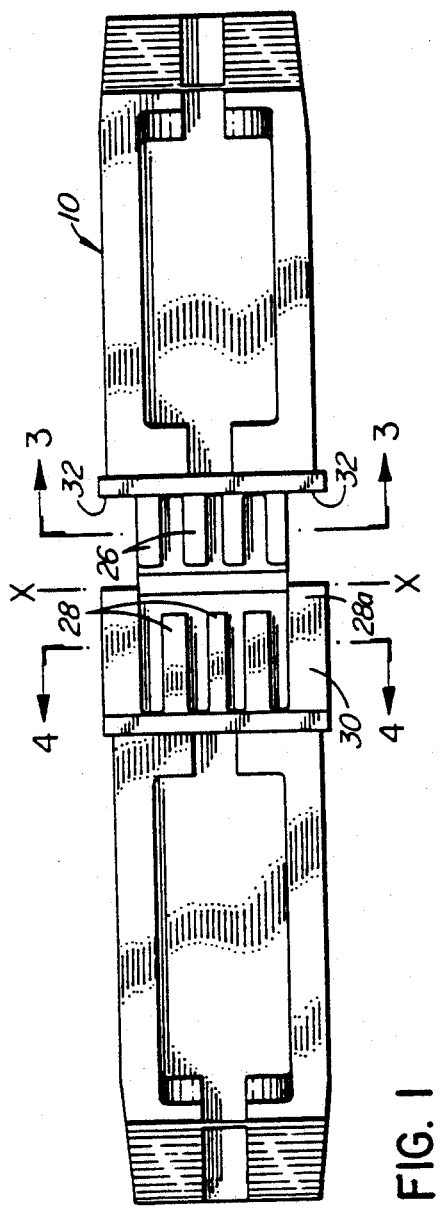
FIG. 1 is a top plan view of the corner piece.
Figure 3:
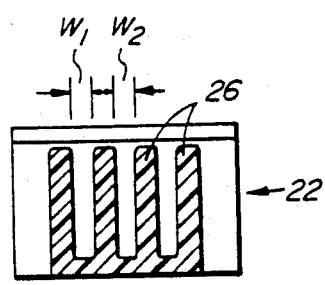
FIG. 3 is a cross-section view taken along line 3—3 of FIG. 1.
Figure 4:
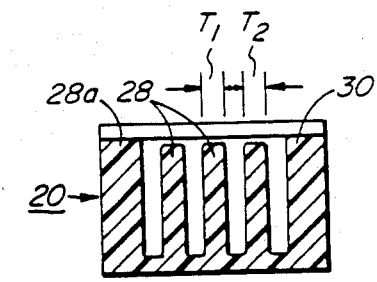
FIG. 4 is a cross-section view taken along line 4—4 of FIG. 1.
Figure 5:
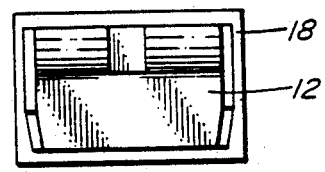
FIG. 5 is an end elevation view of the corner piece when in the full line position illustrated in FIG. 2.

It will be noted from FIGS. 1, 3 and 4, in particular, that the first and second sets of fins 20 and 22 comprise a multiplicity of individual fins 26 and 28, all of which fins extend generally normal to the above-noted hinge axis X—X. The fins 28 of the first set 20 are adapted to come into tight interdigitating or interleaved relationship with the fins 26 of the second set 22 as the arms are pivoted into the right angle relationship illustrated in FIG. 2. The first and second sets of fins 20 and 22, comprise multiple, spaced apart, generally parallel fins 26, 28 firmly connected to the respective arms 12, each of these fins having generally planar walls which are substantially devoid of interengaging catches, recesses or the like so that substantially pure frictional engagement takes place between the tightly interleaved fins 26 and 28. By way of example, in one embodiment, the nominal fin thickness T as measured adjacent the upper outer edge of the fins (FIG. 4) was about 50 thousandths of an inch while the nominal width between fins W (see FIG. 3) was about 48 thousandths of an inch. In addition to the above interference, the fin walls are slightly angled relative to one another to provide a small amount of draft so that as the arms 12 are moved toward the right angle relationship, the tightness of the fit between the interleaved fins 26 and 28 increases. The amount of draft need not be large and in fact if the fin walls are angled inwardly by angles in the order of about 2°, good results can be expected.

The fins of the first set 20, as best seen in FIGS. 1 and 4, include a relatively thick pair of fins 28a arranged in outwardly disposed flanking relationship to the remaining fins 28. These fins 28a are much thicker than the remaining fins and serve to reinforce or buttress the interleaved fins against undue deflection thereby ensuring that a relatively high frictional force is developed between them. The, outwardly facing surfaces of these fins 28a are continuous surfaces. When the corner piece is in use these outwardly facing surfaces are disposed in close proximity to the adjacent faces of the glazing panels with a layer of a suitable sealing compound between them to prevent ingress of moisture into the space between the glazing panels. The continuous outer surfaces of fins 28a help to ensure that the sealing compound remains where it is needed in contrast to certain prior art constructions which have recesses and openings permitting escape of the sealing compound into the corner piece.

When the arms 12 are brought into the right angle relationship, the upper surfaces 30 of fins 28a on one arm come into abutting relationship with shoulder portions 32 formed on the other arm thereby to define stop means which serves to establish the generally right angular relationship between the two arms 12. This angle need not be exactly 90° and in fact the angle between the two arms when in the folded condition is preferably made slightly greater than 90° so that when the corner pieces are in place within the respective spacer tubes and the spacer frame assembly is squared up, the several corner pieces exert a degree of biasing force which stabilizes the overall spacer frame assembly and helps avoid distortions of same. (Although the above noted right angular relationship is by far the most common configuration other angular configurations may be provided to suit special window shapes.)

The above-described corner piece may be manufactured by a fairly simple and straightforward molding procedure. Since it does not include any interlocking or dove-tailed surfaces or the like or any complex catches, the molding process is considerably simplified. The corner piece is very easy to use, reliable, durable and it can be produced in large quantities at relatively low cost. It presents a highly desirable alternative to existing folding corner pieces which employ snap-fit interlocks and the like as previously noted.

In use, the spacer tubes (not shown) are cut to length and the corner pieces inserted into the spacer tube sections. The assembly of spacer tube sections and corner pieces is allowed to remain in the straight line or linear condition during subsequent processing or treating steps and may of course be shipped to the ultimate user in this condition. The user then squares the assembly into the desired rectangular shape and inserts the last corner piece into the arm to complete the rectangle, following which the spacer assembly is interposed between a pair of glazing panels at the perimeter of same and is sealed thereto by use of a suitable sealing compound (not shown).

A preferred embodiment of the invention has been described by way of example. Those skilled in this art will realize that numerous modifications and changes may be made within the scope of the invention, definitions of which are set out in the amended claims.

I claim:

1. A corner piece for use in a spacer tube assembly comprising:
    (a) a pair of arms each adapted to enter into and engage within an end portion of a respective spacer tube;
    (b) hinge means defining a hinge axis ad permitting said arms to be pivoted into a predetermined angular relationship with each other;
    (c) friction means on each of said arms adapted to come into close contacting relation with each other as said arms are pivoted toward said predetermined angular relationship to frictionally retain said arms in said predetermined angular relationship;
    (d) said friction means comprising fin means on each of said arms which extend generally normal to said hinge axis, the fin means on one said arm being arranged to come into tight interdigitating or interleaved relation with the fin means on the other said arm as said arms are pivoted toward said predetermined angular relationship;
    (e) said fin means being in the form of multiple, spaced, generally parallel fins on each of said arms, the fins having generally planar walls which are substantially devoid of interengaging catches or recesses so that substantially pure frictional engagement takes place between the tightly interleaved fins of said arms.

2. The corner piece of claim 1 being of a one-piece molded plastics construction and said hinge means comprising a thin flexible portion located between said arms.

3. The corner piece of claim 2 wherein said fin means are disposed closely adjacent said hinge means, the fin means defining multiple fin walls which are slightly angled relative to one another to provide a small amount of draft so that as the arms are moved toward the predetermined angular relation the tightness of the interdigitating or interleaved relation between the fin means increases.

4. The corner piece of claim 1 wherein stop means are provided on said arms to define said predetermined angular relationship.

5. The corner piece of claim 1 wherein stop means are provided on said arms to define an angular relationship of about 90° between said arms.

6. The corner piece of claim 1 when made of nylon plastics.

7. The corner piece of claim 1 wherein said arms include integral teeth for engaging the interior of the spacer tube.

8. The corner piece of claim 1 wherein said fin means include a relatively thick pair of fins arranged in outwardly disposed flanking relation to certain of the remaining fins so as to reinforce or buttress the interleaved fins against undue deflection to help ensure that a relatively high frictional force is developed between them.

9. The corner piece of claim 3 wherein said fin means include a relatively thick pair of fins arranged in outwardly disposed flanking relation to certain of the remaining fins so as to reinforce or buttress th interleaved fins against undue deflection to help ensure that a relatively high frictional force is developed between them.

10. The corner piece of claim 1 wherein said fin means include a pair of fins which are in outwardly disposed flanking relation to the remaining fins when said arms are in said predetermined angular relationship with one another, said pair of fins defining continuous outer surfaces which in use are disposed in close proximity to a pair of glazing panels, said continuous outer surfaces assisting in keeping a sealing compound between said outer surfaces and said panels.

* * * * *